United States Patent
Oscarsson (10) Patent No.: US 10,761,234 B2
(45) Date of Patent: Sep. 1, 2020

(54) EM ELECTRODE

(71) Applicant: PGS Geophysical AS, Oslo (NO)

(72) Inventor: Mattias Oscarsson, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 89 days.

(21) Appl. No.: 16/092,921

(22) PCT Filed: Apr. 4, 2017

(86) PCT No.: PCT/EP2017/057938
§ 371 (c)(1),
(2) Date: Oct. 11, 2018

(87) PCT Pub. No.: WO2017/178278
PCT Pub. Date: Oct. 19, 2017

(65) Prior Publication Data
US 2019/0129054 A1    May 2, 2019

Related U.S. Application Data (60) Provisional application No. 62/322,852, filed on Apr. 15, 2016.

(51) Int. Cl.
| | | |
|---|---|---|
| G01V 3/17 | (2006.01) | |
| G01V 3/02 | (2006.01) | |
| G01V 3/15 | (2006.01) | |
| G01V 3/12 | (2006.01) | |

(52) U.S. Cl.
CPC .................. *G01V 3/17* (2013.01); *G01V 3/02* (2013.01); *G01V 3/12* (2013.01); *G01V 3/15* (2013.01)

(58) Field of Classification Search
CPC ... G01V 3/17; G01V 3/02; G01V 3/12; G01V 3/15
USPC ......................................................... 324/365
See application file for complete search history.

(56) References Cited

U.S. PATENT DOCUMENTS

| | | | |
|---|---|---|---|
| 2,549,777 A | 4/1951 | Craig | |
| 3,940,732 A | 2/1976 | Hudson et al. | |
| 8,987,598 B1 | 3/2015 | Gershenson et al. | |
| 2003/0117025 A1* | 6/2003 | Rouquette | G01V 1/201 |
| | | | 307/147 |
| 2006/0105639 A1* | 5/2006 | Tamm | H01R 4/20 |
| | | | 439/839 |
| 2012/0153959 A1 | 6/2012 | Mackay | |
| 2013/0119996 A1* | 5/2013 | Mackay | G01V 3/083 |
| | | | 324/347 |

FOREIGN PATENT DOCUMENTS

CN          202749110 U  *  2/2013  ............... H01B 7/02

OTHER PUBLICATIONS

Baojun et al.; Translation of CN202749110U; Pub. Date Feb. 20, 2013; Google and EPO (Year: 2013).*

(Continued)

*Primary Examiner* — Melissa J Koval
*Assistant Examiner* — Rahul Maini (57) ABSTRACT

An electrode. The electrode includes a compressible form having an outer surface. A plurality of electrically conducting wire strands is disposed in a wire layer on the outer surface. The wire layer substantially covers the outer surface of the compressible form, and each wire strand comprises a first end and a second end configured to couple to a source of electromagnetic energy.

18 Claims, 7 Drawing Sheets

(56) References Cited

OTHER PUBLICATIONS

International Search Report dated Jun. 6, 2017 for PCT application PCT/EP2017/057938 filed Apr. 4, 2017; 4 pages.
Written Opinion dated Jun. 6, 2017 for PCT application PCT/EP2017/057938 filed Apr. 4, 2017; 6 pages.

* cited by examiner

EM ELECTRODE

CROSS-REFERENCE TO RELATED APPLICATIONS

This application is a U.S. National Phase Entry of PCT application serial no. PCT/EP2017/057938 filed Apr. 4, 2017 and titled "EM Electrode." The PCT application claims the benefit of U.S. Provisional Application Ser. No. 62/322,852 filed Apr. 15, 2016 and titled "Electromagnetic Electrode". Both applications are incorporated by reference herein as if reproduced in full below.

BACKGROUND

Marine survey systems are used to acquire data (e.g. seismic data, electromagnetic data, etc.) regarding Earth formations below a body of water such as a lake or ocean. Many marine survey systems use one or more sensor streamers towed behind a vessel. Other marine survey systems locate sensors on or near the ocean bottom (i.e. sea floor) on cables or nodes. Some sensors detect one or more parameters associated with an electromagnetic source.

Electromagnetic sources in related art systems may include one or more electrodes in contact with a water body coupled via a cable to a source of electromagnetic energy. The physical size and bulk of the electrodes may be such that a cable winch used to recover the cable is not sufficient to recover the electrode from the water body. Recovery of the electrodes may then require the deployment on board a survey vessel of ancillary heavy lifting equipment, such as a crane, and the employment of manpower in conjunction therewith. Thus, an electrode for use in an electromagnetic survey recoverable without the use of such heavy equipment would have a competitive advantage in the marketplace.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, a component may be referred to by different names by persons skilled in the art. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"About" as used herein in conjunction with a numerical value shall mean the recited numerical value as may be determined accounting for generally accepted variation in measurement, manufacture and the like in the relevant industry.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
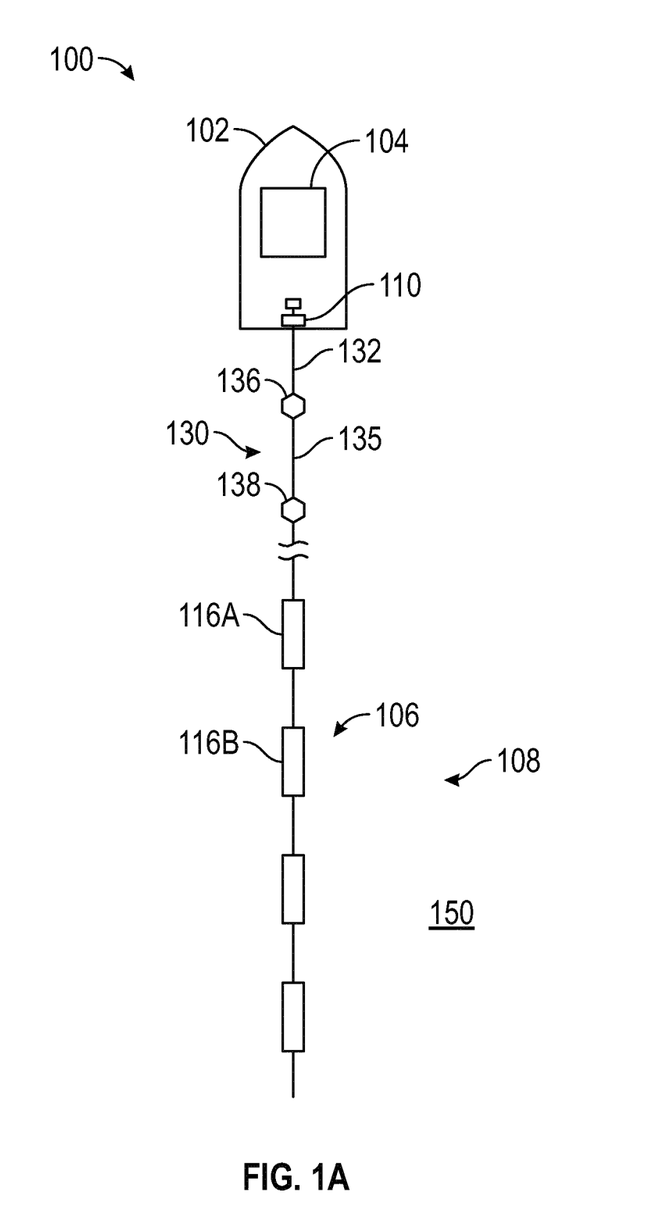
FIG. 1A shows, in an overhead view, a marine survey system in accordance with an embodiment.

FIG. 1A shows an overhead view of a marine survey system 100 in accordance with at least some embodiments. In particular, FIG. 1A shows a survey vessel 102 having onboard equipment 104, such as navigation, energy source control, and data recording equipment. Survey vessel 102 is configured to tow at least one sensor streamer 106 through the water 150. The sensor streamer 106 may couple to the onboard equipment 104 by electrical and/or optical connections between the appropriate components in the onboard equipment 104 and the sensors (e.g. 116A, 116B) in the sensor streamer 106. Sensor streamer 106 and its sensors 116 thus form a sensor array 108. Sensor streamer 106 may be of any length used in sensor streamers in electromagnetic surveys. In some cases, the sensor streamer 106 may have a length of about 8000 meters as measured starting at the survey vessel 102, but the first sensor 116 may be positioned at least about 2000 meters from the survey vessel 102. In some embodiments, marine survey system 100 may include seismic sources and/or seismic sensors.

In at least some embodiments, sensors 116 may be pairs of sensor electrodes disposed at spaced apart positions along the sensor streamer 106. In other examples, each sensor 116 is a one-dimensional electrical field sensor configured to be most sensitive to electric fields aligned with the direction of travel of the survey vessel 102 (or stated otherwise, most sensitive to electric field polarizations aligned with the longitudinal axis of the sensor streamer 106). Moreover, sensors 116 may include magnetic field sensors in place of, or in addition to, the electric field sensors. For example, a single axis or multi-axis magnetometer, such as a flux gate magnetometer, may be used in place of or in combination with electric field sensors. In yet still other cases, the sensors 116 may be sensors that sense the combination of electric and magnetic fields. While sensor streamer 106 is shown to have four sensors 116 so as not to unduly complicate the figure, in actual use the sensor streamer 106 may have as many as fifty or more sensors 116. Regardless of the type of sensors used, the sensors detect at least a portion of the electromagnetic fields imparted by an electromagnetic source.

In some embodiments, the survey vessel 102 also tows an electromagnetic source 130 (hereafter just source 130) by way of electromagnetic source cable bundle 132 (hereinafter just cable bundle). The source 130 may comprise two electrodes 136 and 138 towed inline with the sensor streamer 106. In the illustrated embodiment, the cable bundle 132 comprises two electrically insulated cables (not separately shown in FIGS. 1A and 1n FIG. 1B described below), and thus the electrical conductors of each insulated cable are electrically insulated from each other and from the surrounding water 150. Both insulated cables may be mechanically coupled to the first electrode 136, and one insulated cable is electrically coupled to the first electrode 136. The second insulated cable 135 of the cable bundle 132 may be disposed between the first and second electrodes and is both mechanically and electrically coupled the second electrode 138. It follows that the towing force applied to the first electrode 136 may be carried by one or both the insulated cables of the cable bundle 132, and the towing force for the second electrode 138 is carried by the insulated cable 135.

In at least some embodiments, source 130 may provide electromagnetic currents in the range of from about 100 amps to about 3000 amps. The currents may be either direct current (DC) or in other embodiments, alternating current (AC). A frequency of the AC may be in the range from about 0.01 Hz to about 100 Hz. The foregoing are by way of example, and it would be appreciated by those skilled in the art having the benefit of the disclosure that a wide range of currents and frequencies may be embodied in accordance the principles of the disclosure.

Figure 1B:
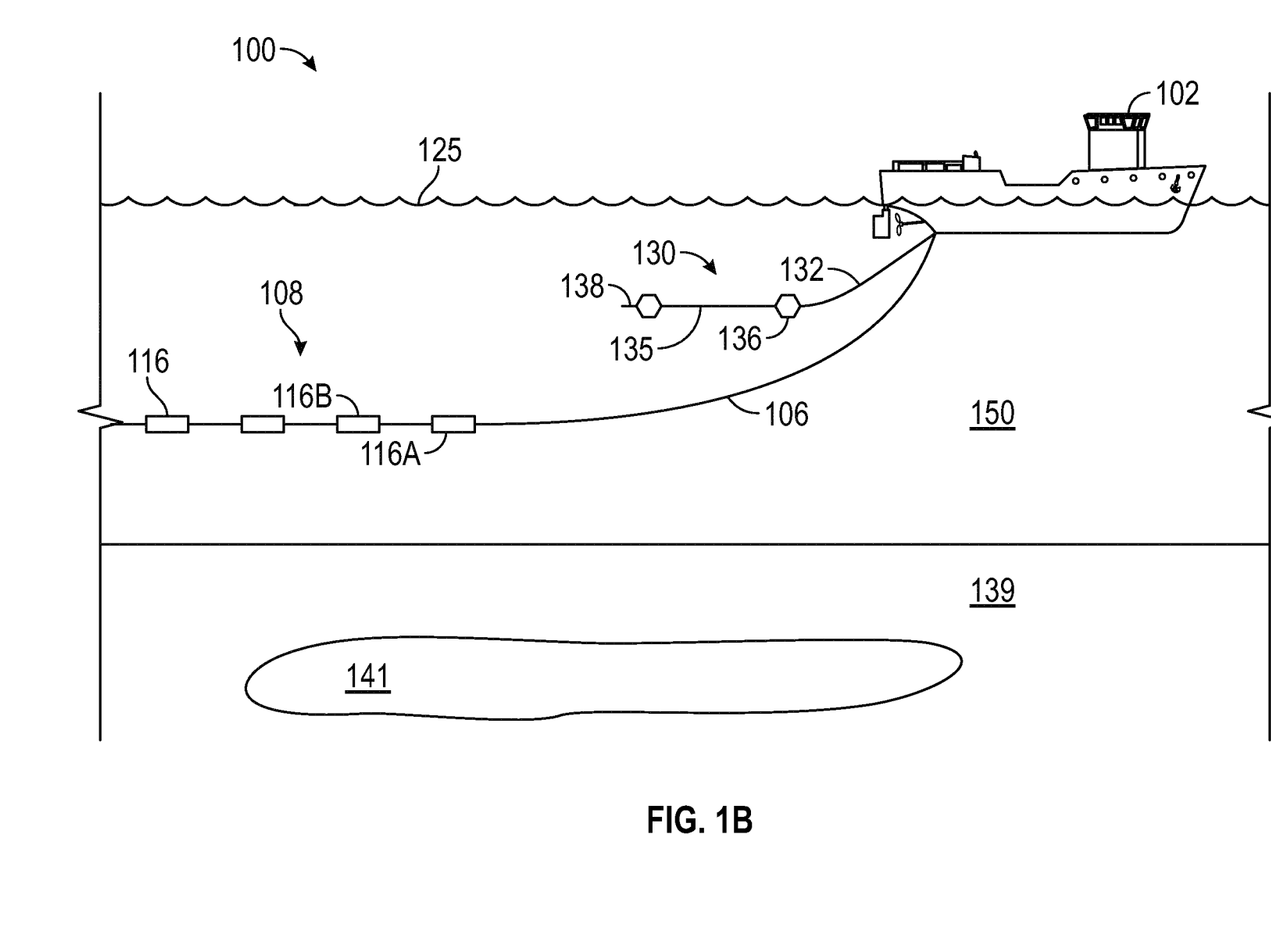
FIG. 1B shows, in a side view, a marine survey system in accordance with an embodiment.

FIG. 1B shows a side elevation view of the marine survey system 100. Source 130 including the first and second electrodes 136 and 138, respectively, may be towed by the survey vessel 102 through the water 150 beneath surface 125 of the water 150 and above a formation 139 which may include a hydrocarbon deposit 141. In the example marine survey system 100, sensor streamer 106 is towed at a depth beneath the surface 125 greater than a depth of the source 130. As described above in conjunction with FIG. 1A, electrode 136 may be mechanically coupled to each of the insulated cables (not separately shown) in cable bundle 132 with one insulated cable electrically coupled to electrode 136 and the second insulated cable 135 electrically and mechanically coupled to electrode 138.

Figure 2:
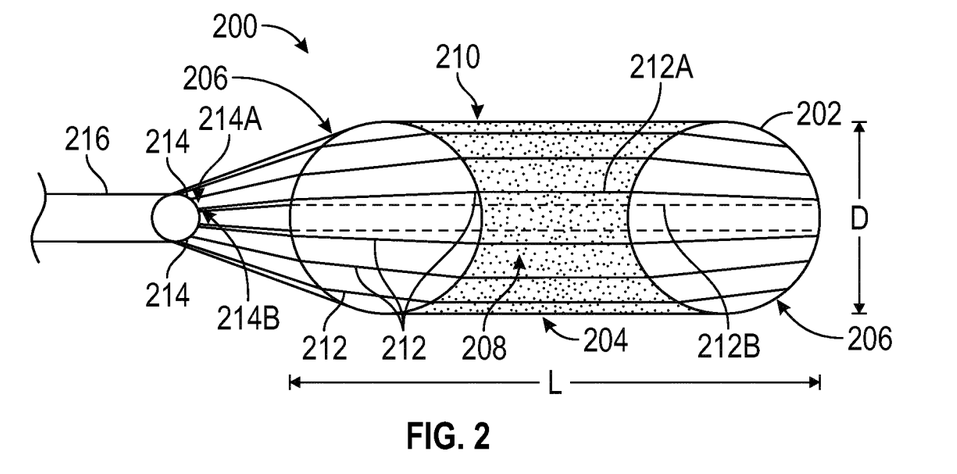
FIG. 2 shows an electrode in accordance with an embodiment.

FIG. 2 shows an electrode 200 in accordance with at least some embodiments. Electrode 200 may be used in conjunction with a marine survey system to provide an electrode 136 and/or electrode 138. Electrode 200 comprises a compressible form 202 having a central portion 204 and ends 206. In at least some embodiments, central portion 204 may be substantially cylindrical in cross-section and ends 206 may be substantially spherical in shape. Form 202 may have a length, L, which, in some embodiments may be about ten meters (10 m). Ends 206 may have a diameter, D, which may be about one-half meter (0.5 m) in at least some embodiments. Alternatively, other lengths and/or diameters may be used. For example, lengths L may be in the range from about 5 m to about 15 m, and diameters D may be in the range from about 0.3 m to about 1.5 m. Compressible form 202 may be made of any suitable compressible material. In other words, compressible form 202 may be any suitable sponge-like material having a closed cellular structure, a closed-cell elastic polymer, for example, such that a buoyancy of electrode 200 may be maintained. An exemplary material that may be used is closed-cell polyethylene. Other materials that may be used include closed-cell neoprene and closed-cell gym rubber (polyvinyl chloride nitrile butadiene rubber).

A wire layer 208 is disposed about an outer surface 210 of compressible form 202. Wire layer 208 may be comprised of a plurality of wire strands 212. Wire strands 212 may form wire layer 208 for example by weaving or braiding the wire strands, as described further below. Although wire layer 208 is shown as sparsely covering outer surface 210 for ease of illustration of the principles of the disclosure, wire strands 212 may substantially cover outer surface 210 in dense fashion, wherein the wire strands form a weave, as described further in conjunction with FIG. 6. In at least some embodiments a mass of wire layer 208 may be about thirty kilograms (30 kg). In at least some embodiments, wire strands 212 may be stacked atop one another (not shown in FIG. 2) within wire layer 208 to obtain a desired mass. The wire layer mass may be selected such that a preselected electrical resistance of electrode 200 is obtained. In at least some embodiments, for example, the mass of wire layer 208 may be in the range from about 10 kg to about 150 kg. For a preselected electrical resistance of electrode 200, the mass of wire layer 208 may vary based on the composition of the wire strands 212. Further, each of wire strands 212 may comprise a composite structure as shown in FIG. 3.

Figure 3:
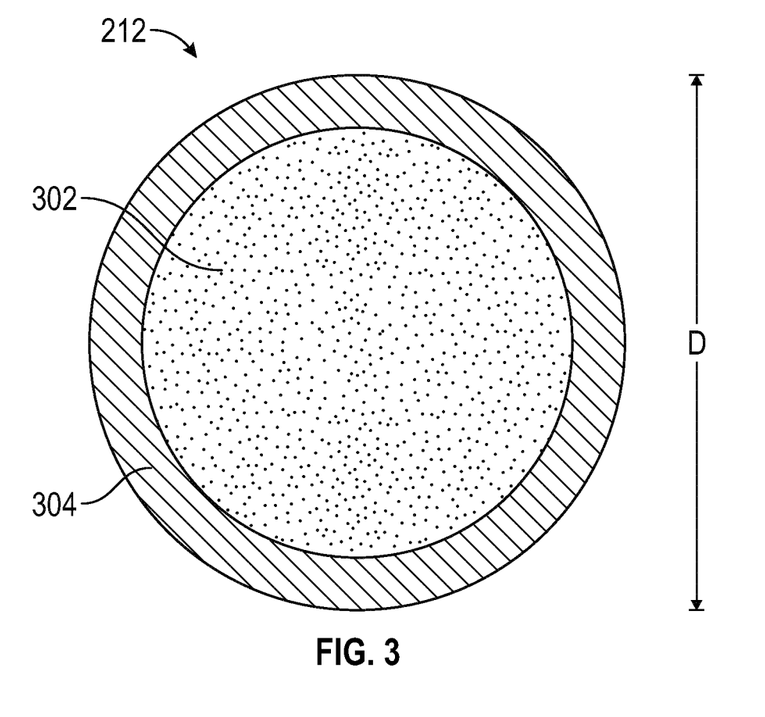
FIG. 3 shows a cross-sectional view of a wire strand in accordance with an embodiment

FIG. 3 shows a cross-sectional view of a wire strand 212 in accordance with at least some embodiments. Wire strand 212 includes a core 302 and cladding 304. Core 302 may comprise a conducting material such as copper. Cladding 304 may comprise a conducting material that is corrosion resistant in sea water. Exemplary materials include stainless steel, nickel and nickel alloys. Core 302 may have a diameter, d, which, in at least some embodiments may be about 0.4 millimeters (mm). In at least some other embodiments, the core 302 may have a diameter in the range of about 0.2 mm to about 0.8 mm. In at least some embodiments, the thickness of the cladding 304 may be substantially less than the diameter the core 302 such that a diameter of a wire strand 212 is substantially the same as the diameter of the core 302. The foregoing is by way of example, and other diameters may be used consistent with the core material and the currents carried by electrode 200. Further, in at least some embodiments, wire strands 212 may comprise a corrosion resistant conducting material throughout, for example nickel, without the use of a cladding.

Returning to FIG. 2, each of wire strands 212 may include at least one end 214 that may be connected to a cable 216 which may be, for example, one of the cables comprising cable bundle 132 (FIG. 1). Further, in at least some embodiments, wire strands 212 may have a first end 214A and a second end 214B that couple to cable 216 as wire strands 212 within wire layer 208 loop around compressible form 202. Stated otherwise, in at least some embodiments, the second end of each wire strand may pass around the end of compressible form 202 distal to the cable 216 and return to connect to cable 216. This is schematically shown by portions 212A and 212B (shown dashed) of one of the wire strands 212. As described further in conjunction with FIG. 6, wire strands 212 may be woven or braided to form wire layer 208. An alternative mechanism to couple electrode 200 to a cable 216 is shown in FIG. 4.

Figure 4:
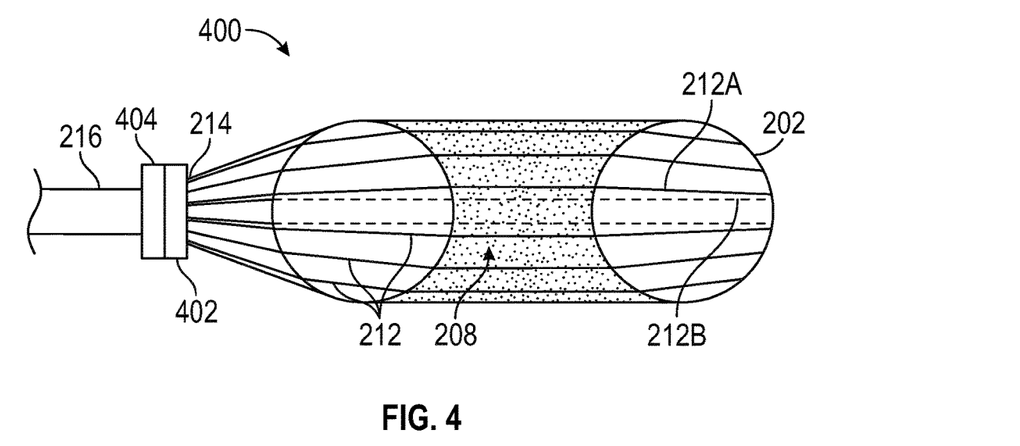
FIG. 4 shows an electrode in accordance with an embodiment.

Referring to FIG. 4, in an alternative embodiment, wire strands 212 of an electrode 400 may be electrically and mechanically coupled to a connector 402. A cable 216 may similarly be coupled to a mating connector 404. In this way, an electrode 200 may readily be attached to and detached from a cable 216 for replacement, maintenance or storage, and the like. And, wire layer 208 formed from the woven or braided wire strands 212 may be electrically coupled to an electromagnetic source (not shown in FIG. 4) via cable 216. As would be appreciated by those skilled in the art with the benefit of the disclosure, connectors used to attach related-art cables and electrodes may be used in conjunction with connectors 402 and 404.

Figure 5:
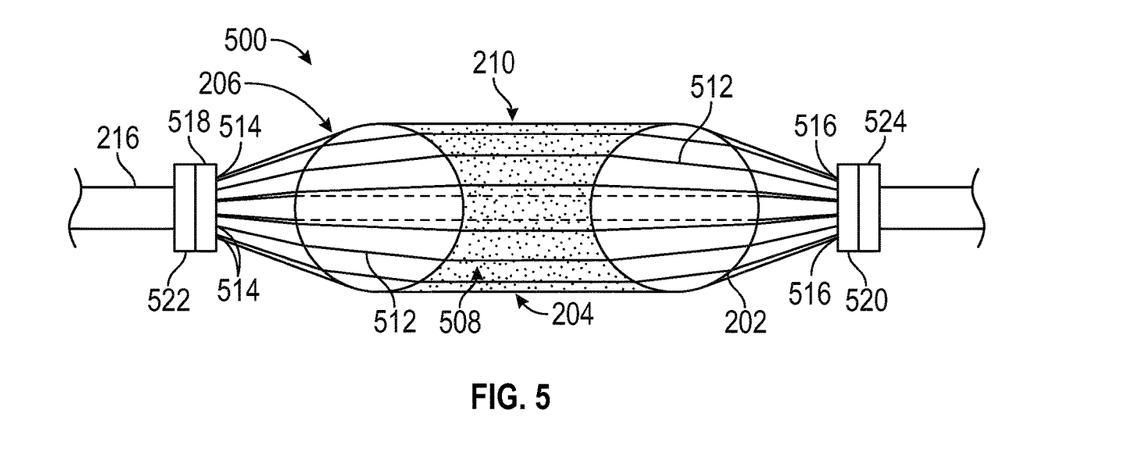
FIG. 5 shows an electrode in accordance with an embodiment.

FIG. 5 illustrates an electrode 500 in accordance with at least some embodiments. Similar to electrode 200 (FIG. 2), electrode 500 includes a compressible form 202 having an outer surface 210 and a wire layer 508 comprising a plurality of wire strands 512 disposed thereon. Each of wire strands 512 may have a first end 514 and a second end 516 coupled to connectors 518 and 520, respectively. Wire strands 512 may have substantially the same physical properties as described above in conjunction with wire strands 212 (FIG. 2 and FIG. 3). Mating connectors 522 and 524 may be configured to connect to connectors 518 and 520. A cable 216 may be coupled to connector 522. A cable 528 may be coupled to connector 524. In this way, two or more electrodes 500 may be coupled together in series, or one or more electrodes 500 may be serially connected to an electrode 400 (FIG. 4).

Figure 6:
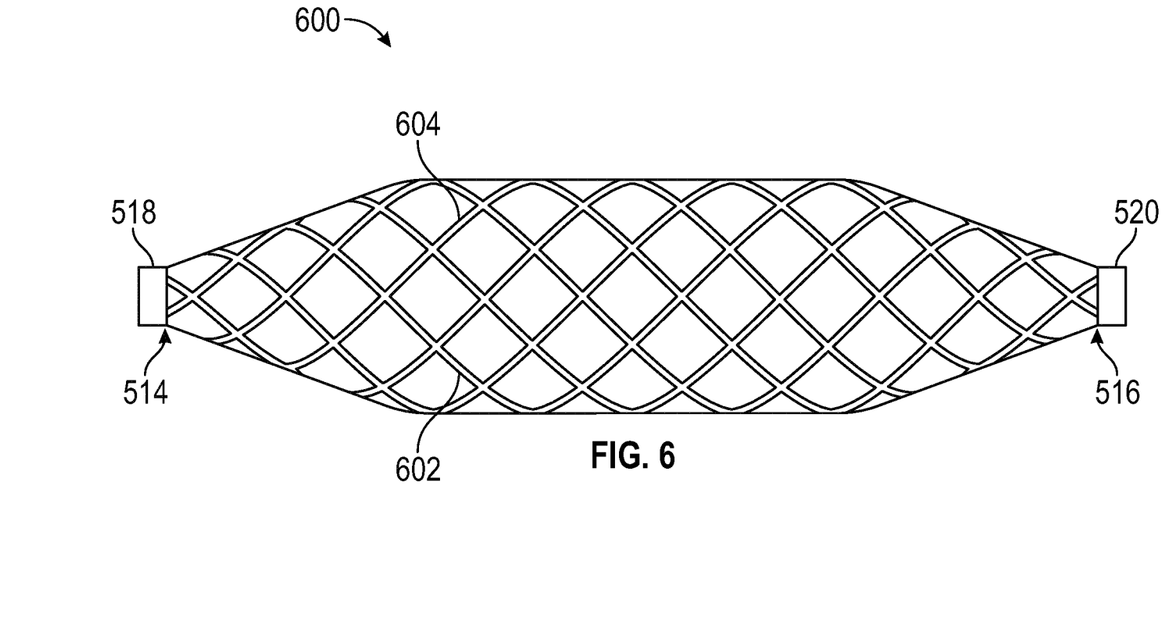
FIG. 6 shows a wire layer in accordance with an embodiment.

Turning now to FIG. 6, FIG. 6 shows a wire layer 600 in accordance with at least some embodiments. Wire layer 600 may be used in conjunction with an electrode such as electrode 200 (FIG. 2), electrode 400 (FIG. 4) or electrode 500 (FIG. 5) to provide a corresponding wire layer 208 (FIGS. 2, 4) and 508 (FIG. 5). FIG. 6 illustrates an exemplary weave pattern comprising helically-braided wire strands. Wire layer 600 comprises two sets of wire strands 602 and 604. Wire strand sets 602 and 604 are disposed about the outer surface of a compressible form (not shown in FIG. 6) in a braid in which the two sets form oppositely-sensed, or "handed", helices. Similar to wire layer 508 (FIG. 5), wire layer 600 may be coupled to connectors at respective ends 514 and 516 thereof. Further, as described above, a mass of wire layer 600 may have a value based on a desired electrical resistance of the electrode comprising wire layer 600. Thus, wire layer 600 may comprise multiple sets of braided wire strands overlaid one another (not shown in FIG. 6 for ease of illustration) to obtain a particular mass of the wire layer.

Figure 7A:
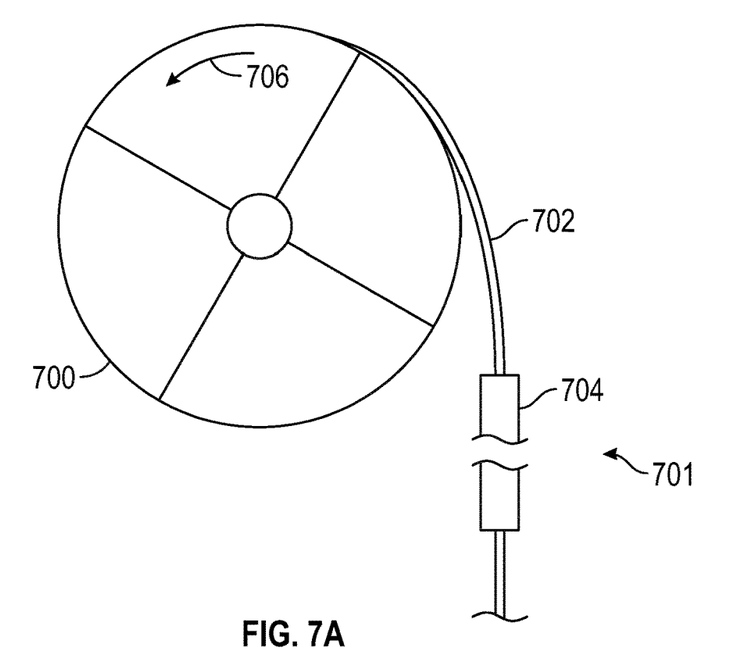
FIGS. 7A and 7B show, in two views, operation of a winch drum in conjunction with an electrode in accordance with an embodiment.
Figure 7B:
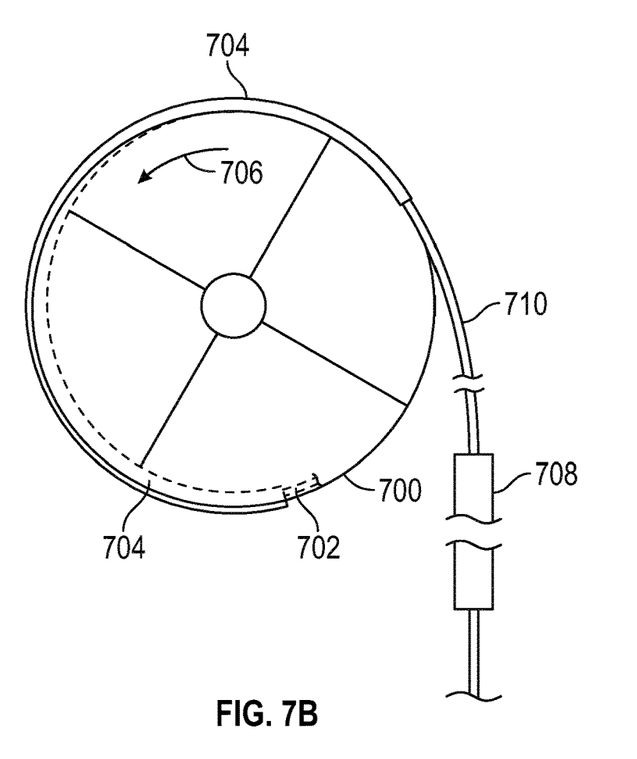

FIGS. 7A and 7B illustrates the operation of a winch drum 700 in conjunction the recovery of a source 701 from a water body (not shown in FIG. 7). Source 701 includes a cable bundle 702 and electrode 704. Embodiments of the electrode 704 may be one of an electrode 200, electrode 400 or electrode 500 describe above. As winch drum 700 is turned in the direction of rotation 706, cable bundle 702 is recovered from the water body (not shown in FIGS. 7A, 7B) and spooled onto winch drum 700. An electrode 704 attached to cable bundle 702, as described above in conjunction with FIGS. 2 and 4, for example is also recovered from the water body without the need for ancillary heavy lifting equipment such as a crane. In other words, because of the light weight and flexibility of electrode 704, it may be directly winched on board the survey vessel (not shown in FIG. 7). Continued rotation of winch drum 700 in the direction of rotation 706, as shown in FIG. 7B, draws electrode 704 onto the winch drum 700. As previously described, a source 701 includes one or more additional electrodes 708 coupled to electrode 704 via cable 710. Tension in the cable bundle 702 and cable 708 in conjunction with reaction forces from winch drum 700 may compress electrode 704 against the winch drum, and any cable sections drawn onto winch drum 700 ahead of electrode 704 (not shown in FIGS. 7A, 7B). Further rotation of winch drum 700 in the direction of rotation 706 draws cable 710 onto the winch drum. As cable 710 is drawn onto the winch drum 700, it may further compress electrode 704 against the winch drum. Further rotation of the winch drum 700 in the direction of rotation 706 may similarly draw electrode 708 into the winch drum.

Figure 8:
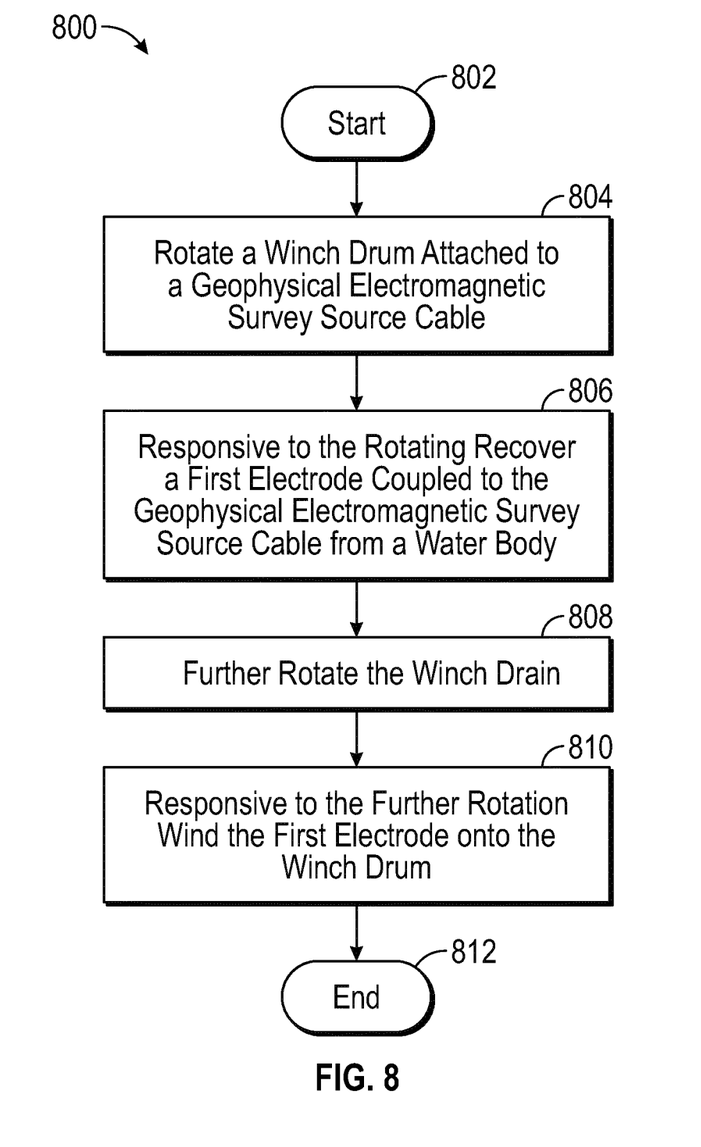
FIG. 8 shows a flow chart of a method in accordance with an embodiment.

FIG. 8 illustrates a flow chart of a method 800 in accordance with some embodiments. Method 800 starts at block 802. In block 804, a winch drum attached to a geophysical electromagnetic survey source cable is rotated. Responsive to the rotating, a first electrode is recovered from a water body, block 806. As described above, the recovering may be without the use of ancillary heavy lifting equipment. In block 808, the winch drum is further rotated, and, responsive to the further rotation, the first electrode is wound onto the winch drum, block 810. As described hereinabove, a second electrode may be coupled to the first electrode by a cable therebetween. The second electrode may be recovered by further rotation of the winch drum wherein the cable between the first and second electrodes may compress the first electrode against the winch drum. Method 800 ends at block 812.

The above discussion is meant to be illustrative of the principles and various embodiments of the present invention. Numerous variations and modifications will become apparent to those skilled in the art once the above disclosure is fully appreciated. For example, various lengths and/or diameters of compressible forms may be used. And, various braid patterns of the wire layer may be used to accommodate manufacturing economies. It is intended that the following claims be interpreted to embrace all such variations and modifications.

The invention claimed is:

1. A source cable for an electromagnetic survey, the source cable comprising:
   a tow cable having a diameter;
   an electrode coupled to the tow cable, the electrode comprising:
      a compressible form having an outer surface and a diameter, the diameter of the compressible form greater than the diameter of the tow cable;
      a plurality of electrically conducting wire strands disposed in a wire layer on the outer surface, wherein the wire layer substantially covers the outer surface of the compressible form; and
      each wire strand of the plurality of electrically conducting wire strands comprises at least one end configured to couple to a source of electromagnetic energy.

2. The source cable of claim 1 wherein a mass of the wire layer is in a range from about 10 kilograms to about 200 kilograms.

3. The source cable of claim 1 wherein:
   each wire strand of the plurality of electrically conducting wire strands comprise a core of a first conductor and a cladding disposed on an outer surface of the core, the cladding comprising a second conductor; and wherein the second conductor is a material that is corrosion resistant in sea water.

4. The source cable of claim 1 wherein each wire strand of the plurality of electrically conducting wire strands has a diameter in the range from about 0.2 millimeters to about 0.8 millimeters.

5. The source cable of claim 1 wherein the compressible form is comprised of a closed-cell elastomer.

6. The source cable of claim 1 wherein the compressible form has a length in the range from about 5 meters to about 15 meters and the diameter of the compressible form in the range from about 0.3 meters to about 1.5 meters.

7. The source cable of claim 1 wherein the compressible form has a first end and a second end; and wherein:
the at least one end of each wire strand of the plurality of electrically conducting wire strands comprises a first end and second end configured to connect to the tow cable proximal to the first end of the compressible form; and wherein
the second end of each wire strand of the plurality of electrically conducting wire strands is disposed within the wire layer such that the second end of each wire strand of the plurality of electrically conducting wire strands is configured to connect to the tow cable after passing around the second end of the compressible form distal to the tow cable.

8. The source cable of claim 7 wherein the first and second ends of the compressible form have a substantially spherical shape.

9. The source cable of claim 3 wherein the core comprises copper and the cladding comprises stainless steel.

10. The source cable of claim 3 wherein the core comprises copper and the cladding comprises nickel.

11. The source cable of claim 1 wherein each wire strand of the plurality of electrically conducting wire strands comprises nickel.

12. An electrode comprising:
a first connector having a diameter;
a compressible elastic polymer form having an outer surface and a diameter, the diameter of the compressible elastic polymer greater than the diameter of the first connector; and
a plurality of electrically conducting wire strands disposed in a wire layer on the outer surface, wherein the wire layer substantially covers the outer surface of the compressible elastic polymer form, and wherein each wire strand of the plurality of electrically conducting wire strands comprises a first end, the first end coupled to the first connector.

13. The electrode of claim 12 wherein the first connector is configured to couple to a mating connector coupled to a cable of an electromagnetic source cable bundle.

14. The electrode of claim 12 wherein the plurality of electrically conducting wire strands in the wire layer comprises:
a first plurality of wire strands disposed in a helical wire braid having a first sense, and
a second plurality of wire strands disposed in a helical braid having a second sense opposite the first sense.

15. The electrode of claim 12 wherein the each wire strand of the plurality of electrically conducting wire strands has a diameter in a range from about 0.2 millimeters to about 0.8 millimeters.

16. The electrode of claim 12 wherein a total mass of the wire layer is in a range from about 10 kilograms to about 200 kilograms.

17. The electrode of claim 12 wherein each wire strand of the plurality of electrically conducting wire strands further comprises a second end, each second end coupled to a second connector distinct from the first connector.

18. The electrode of claim 17 wherein the second connector is configured to couple to a mating connector coupled to another electrode.

* * * * *